(12) United States Patent
Cornell

(10) Patent No.: US 10,723,461 B2
(45) Date of Patent: Jul. 28, 2020

(54) CANTILEVERED MATTRESS

(71) Applicant: Phillip Edouard Cornell, Washington, DC (US)

(72) Inventor: Phillip Edouard Cornell, Washington, DC (US)

( * ) Notice: Subject to any disclaimer, the term of this patent is extended or adjusted under 35 U.S.C. 154(b) by 123 days.

(21) Appl. No.: 16/011,360

(22) Filed: Jun. 18, 2018

(65) Prior Publication Data
US 2019/0202565 A1 Jul. 4, 2019

Related U.S. Application Data

(60) Provisional application No. 62/611,108, filed on Dec. 28, 2017.

(51) Int. Cl.
*B64D 11/06* (2006.01)
*B64D 11/00* (2006.01)

(52) U.S. Cl.
CPC ...... *B64D 11/0641* (2014.12); *B64D 11/0601* (2014.12); *B64D 11/0606* (2014.12); *B64D 11/0624* (2014.12); *B64D 11/0627* (2014.12); *B64D 2011/0069* (2013.01)

(58) Field of Classification Search
CPC ............ B64D 11/0641; B64D 11/0601; B64D 2011/0069; B64D 11/0606; B64D 11/0624; B64D 11/0627; A47C 7/725
USPC .... 297/228.12, 219.1, 248, 252, 253, 217.6; 5/653
See application file for complete search history.

(56) References Cited

U.S. PATENT DOCUMENTS

| | | | | |
|---|---|---|---|---|
| 2,865,433 A | * | 12/1958 | Warner | A47C 1/16 383/25 |
| 4,826,242 A | * | 5/1989 | Trethewey | A47C 7/021 2/69 |
| 5,265,292 A | * | 11/1993 | Underell | A47C 4/52 297/380 |
| 5,403,066 A | * | 4/1995 | Drum | B60N 2/6054 297/219.1 |
| 5,709,448 A | * | 1/1998 | Jennings | G02B 6/001 362/156 |
| 6,854,869 B1 | * | 2/2005 | Fernandez | A47C 7/725 297/184.17 |

* cited by examiner

*Primary Examiner* — Milton Nelson, Jr.

(57) ABSTRACT

A cantilevered mattress that can be positioned along a row of airline seats to provide a resting surface for a user includes a mattress pad and an at least one cantilever. The at least one cantilever is adjacently connected to the mattress pad and laterally extends from the mattress pad in order to engage with the airline seats. The mattress pad includes a padded layer and a plurality of bottom supports, wherein the padded layer cushions the user and the plurality of bottom supports maintain the padded layer in a flat position across the airline seats. The padded layer has a first section that is hinged to a second section, allowing the first section to be lifted and thus enabling the user to take a seated position during takeoff and landing. A seatback cover and privacy curtain may also be included to provide additional privacy, storage, lighting, etc.

16 Claims, 18 Drawing Sheets

CANTILEVERED MATTRESS

The current application claims a priority to the U.S. Provisional Patent application Ser. No. 62/611,108 filed on Dec. 28, 2017.

FIELD OF THE INVENTION

The present invention relates generally to a resting device. More specifically, the present invention is a cantilevered mattress that can be positioned along a row of airline seats to provide a resting surface for user, wherein the cantilevered mattress overhangs the footwell of the aisle to maximize the available space.

BACKGROUND OF THE INVENTION

Airplane travel has revolutionized the ways in which people are transported. While long-distance travel has become much faster and more convenient, flights still often take long periods of time. Aircraft technology and the development of the commercial aviation sector mean that medium- and long-haul flights are becoming more prevalent. Passengers increasingly spend long amounts of time seated on aircraft between takeoff and landing. Consequently, the ability to sleep on commercial flights is increasingly important, and the ability to lie flat has become commonplace in the top-tier cabins of long-haul international flights. However, that is still not possible on the vast majority of domestic US flights, nor on flights in the rapidly expanding low-cost airline sector.

This means the user often encounters several problems. Seats themselves generally do not recline far enough backwards to make them comfortable sleeping options. While some flights are relatively empty, wherein a passenger may have the full row of seats next to them open allowing them to lie down across a row of seats, the passenger may still struggle to sleep due to the discomfort of laying across the row of connected seats. In such cases, the user may find things like the seatbelt buckles, seat divisions, and the limited width of the sleeping surface provided by airline seats to be uncomfortable. What is needed is a means of converting open seats in an otherwise empty row into a fully covered flat surface, without installing specially modified airplane seats. Ultimately, the row can be enclosed to create a small cabin, providing the user with a comfortable and private sleeping space. What is further needed is a means of allowing the user to control the brightness of the created cabin space, and to easily move into and out of the user's seat during takeoff and landing.

Therefore it is an object of the present invention to provide a removable airplane seat mattress that allows a passenger to maximize the use of available space in a row of seats. The present invention is a cantilevered mattress that is attached to one or more airplane seats, wherein the cantilevered mattress extends past the seat cushions, over the footwell in order to maximize the use of available space. The cantilevered mattress includes a mattress pad and at least one cantilever, wherein the at least one cantilever secures the mattress pad to the one or more airplane seats. The mattress pad includes a padded layer on top and a plurality of bottom supports that are spaced along the bottom of the padded layer. The mattress pad can be easily folded or rolled up for storage when not needed. Furthermore, the mattress pad includes a hinged section that allows the passenger to easily uncover the aisle seat, thus enabling the user to buckle into an approved seated position for takeoff and landing. The present invention may further include a seatback cover and a privacy curtain, wherein the seatback cover may provide additional storage and lighting for the user, while the privacy curtain may also provide additional lighting.

DETAIL DESCRIPTIONS OF THE INVENTION

All illustrations of the drawings are for the purpose of describing selected versions of the present invention and are not intended to limit the scope of the present invention.

Figure 1:
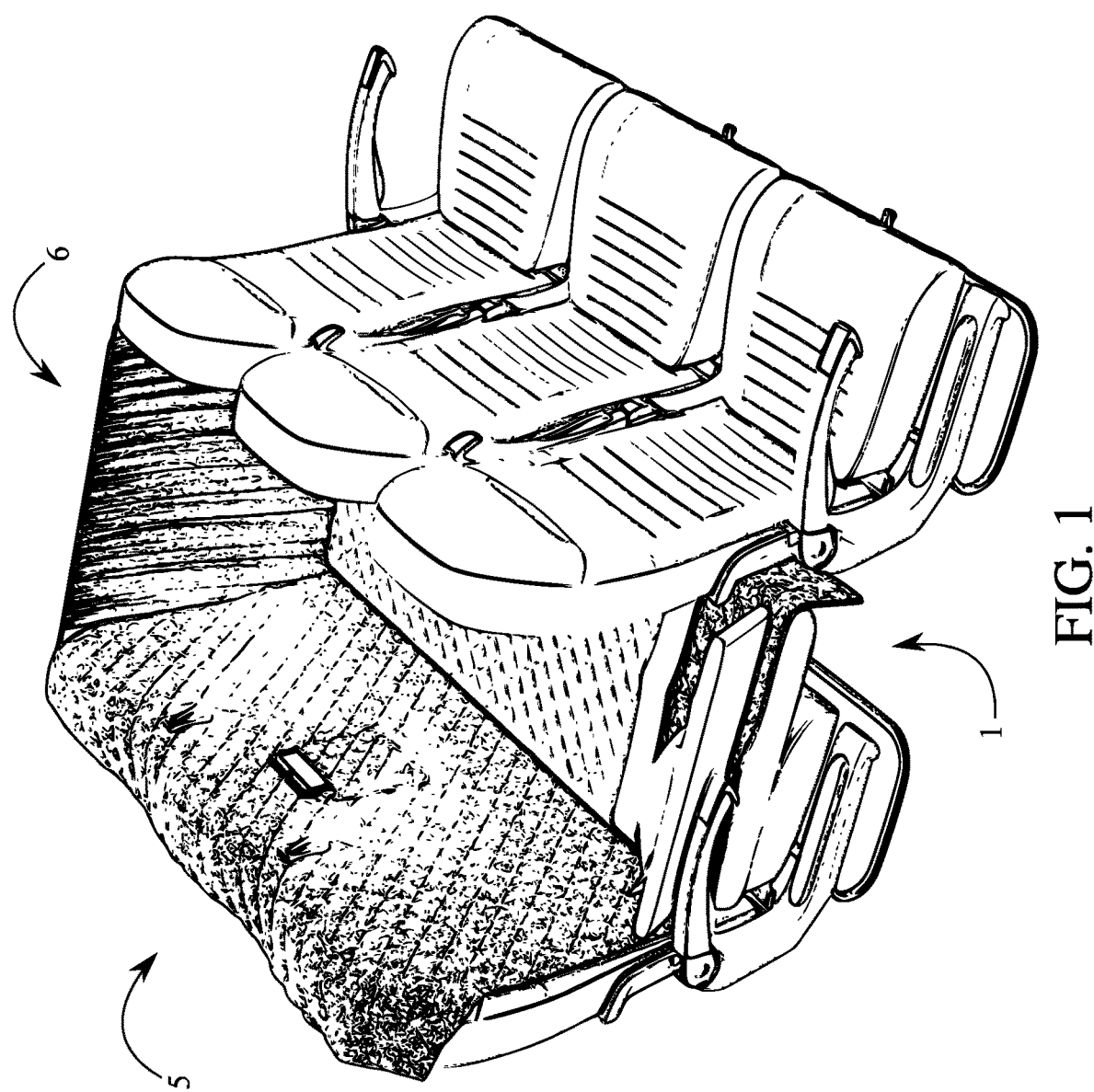
FIG. 1 is a perspective view of the present invention from the window seat, wherein the present invention is implemented within a row of airplane seats.
Figure 2:
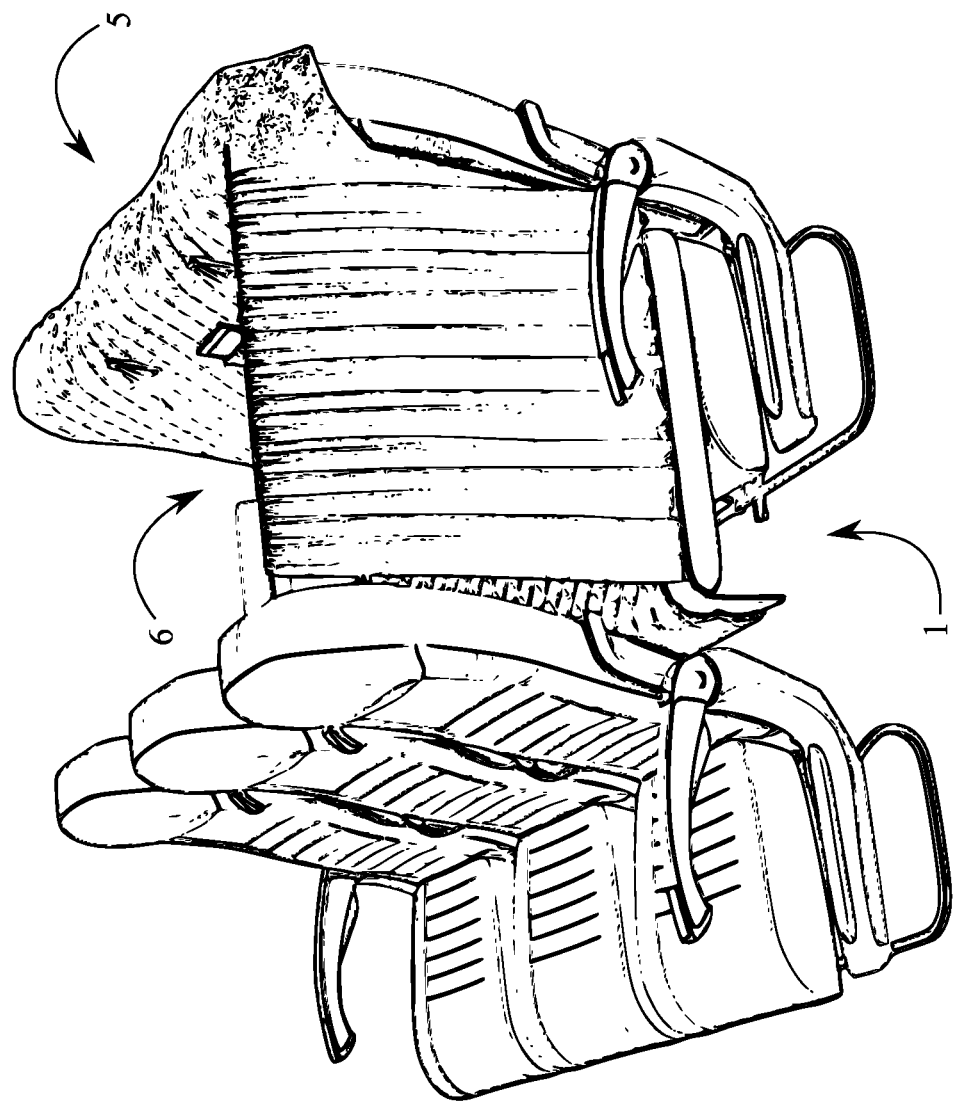
FIG. 2 is a perspective view of the present invention from the aisle seat, wherein the present invention is implemented within the row of airplane seats.
Figure 3:
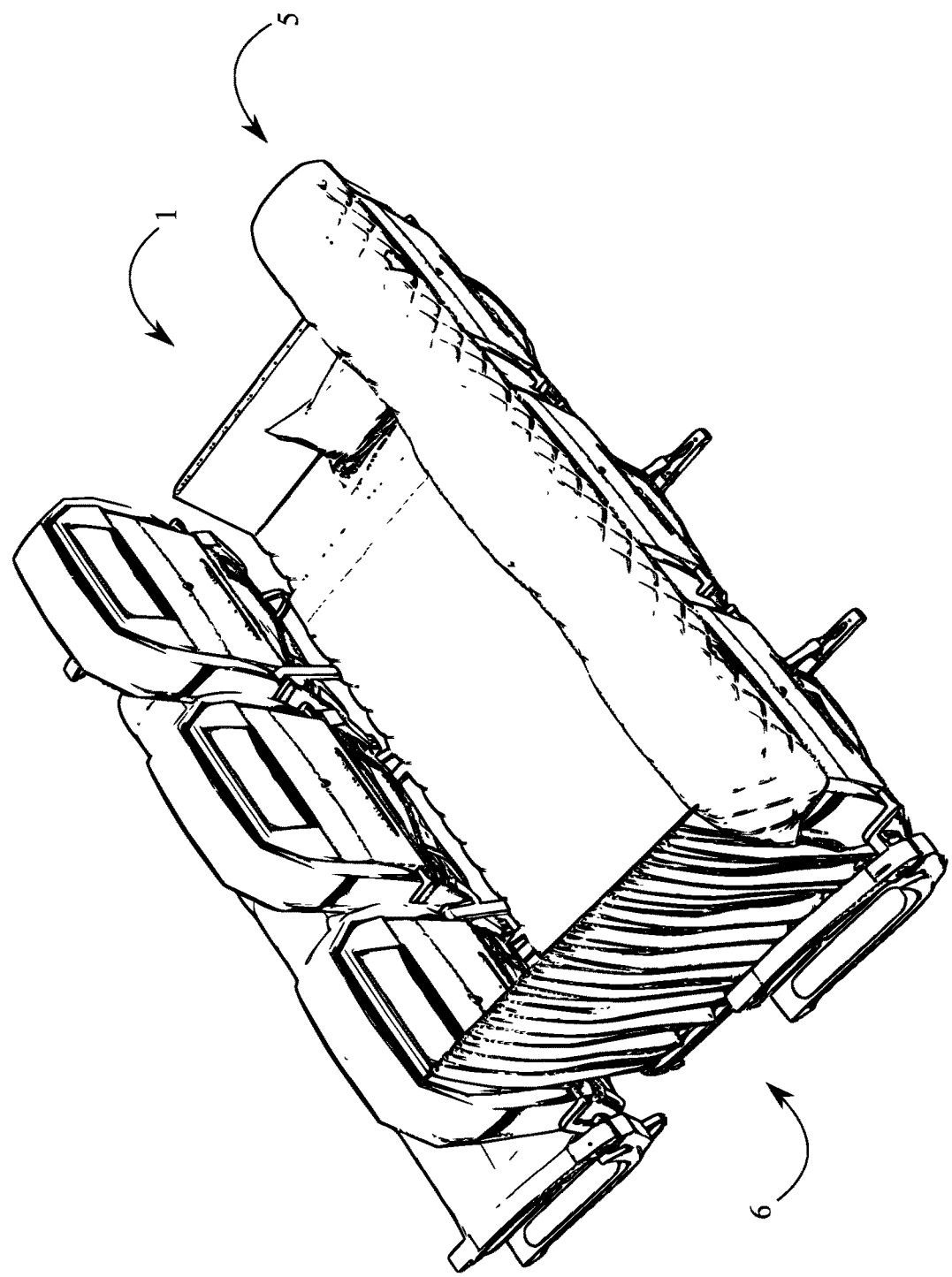
FIG. 3 is a perspective view of the present invention from behind the row of airplane seats.

In reference to FIG. 1-3, the present invention is a cantilevered mattress that can be positioned along a row of airline seats to provide a resting surface for a user, wherein the cantilevered mattress overhangs the footwell of the aisle to maximize the available space. The present invention comprises a mattress pad 1, an at least one cantilever 4, and optionally a seatback cover 5 and a privacy curtain 6. The mattress pad 1 extends along two or more adjacent airplane seats and provides a cushioned resting surface for the user, wherein the mattress pad 1 overhangs the aisle footwell to maximize the resting space available to the user. Meanwhile, the at least one cantilever 4 provides a means for securing the mattress pad 1 to the one or more of the airplane seats. The seatback cover 5 may be used to provide the user with more privacy, provide additional amenities such as storage or lighting, or provide an additional means of securing the mattress pad 1 to the one or more airplane seats. The privacy curtain 6 obscures the main aisle of the aircraft, thus providing the user with more privacy from adjacent seat aisles.

Figure 5:
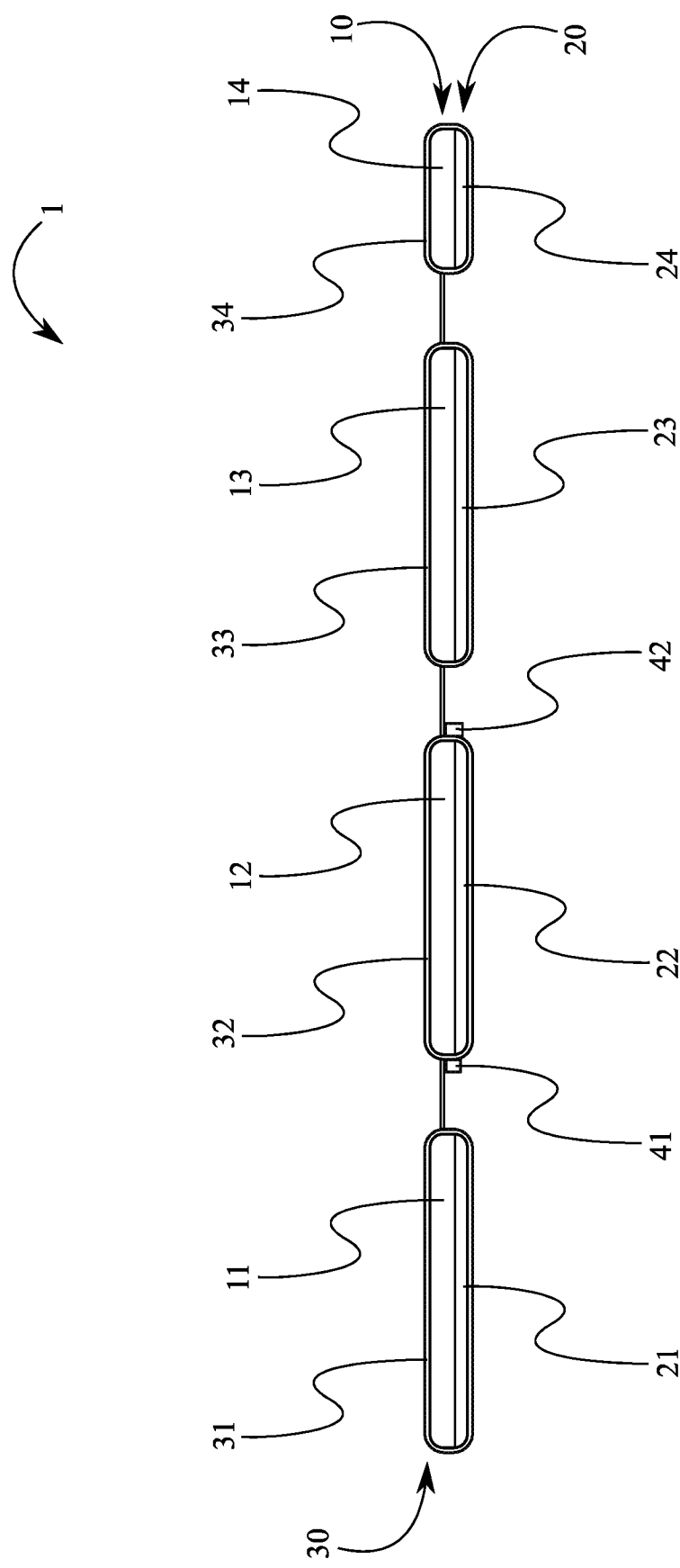
FIG. 5 is a cross section view of the mattress pad, showing the sections of the padded layer and the plurality of bottom supports being distributed within portions of the mattress cover.

The mattress pad 1 comprises a padded layer 10 and a plurality of bottom supports 20. The padded layer 10 provides the top cushioned surface on which the user may rest. Meanwhile, the plurality of bottom supports 20, or alternatively a single rigid panel, provides the padded layer 10 with structural rigidity, such that the padded layer 10 remains in a level position and does not contour to the curves of the one or more airplane seats. As such the plurality of bottom supports 20 is adjacently connected to the padded layer 10, wherein the plurality of bottom supports 20 is distributed about the bottom of the padded layer 10. The plurality of bottom supports 20 is integrated with the padded layer 10 in such a manner as to allow the mattress pad 1 to be either folded or rolled up for storage. In some embodiments, the mattress pad 1 may further comprise a mattress cover 30. The mattress cover 30 may enclose either the padded layer 10 or both the padded layer 10 and the plurality of bottom supports 20 as depicted in FIG. 5.

The at least one cantilever 4 is adjacently connected to the mattress pad 1, wherein each of the at least one cantilever 4 is positioned in between a pair of bottom supports 25 from the plurality of bottom supports 20. Depending on the embodiment, the at least one cantilever 4 may be connected to the padded layer 10, one of the plurality of bottom supports 20, a rigid panel underneath the padded layer 10, or the mattress cover 30. In reference to FIG. 4, the at least one cantilever 4 laterally extends from the mattress pad 1, wherein the at least one cantilever 4 extends away from the seat aisle when the present invention is implemented. Preferably, the at least one cantilever 4 is spaced along the mattress pad 1, such that the at least one cantilever 4 is positioned in between an adjacent pair of the one or more airplane seats. The at least one cantilever 4 may be attached to the seat armrest or another portion of the one or more airplane seats in order to secure the mattress pad 1 to the one or more airplane seats.

Figure 7:
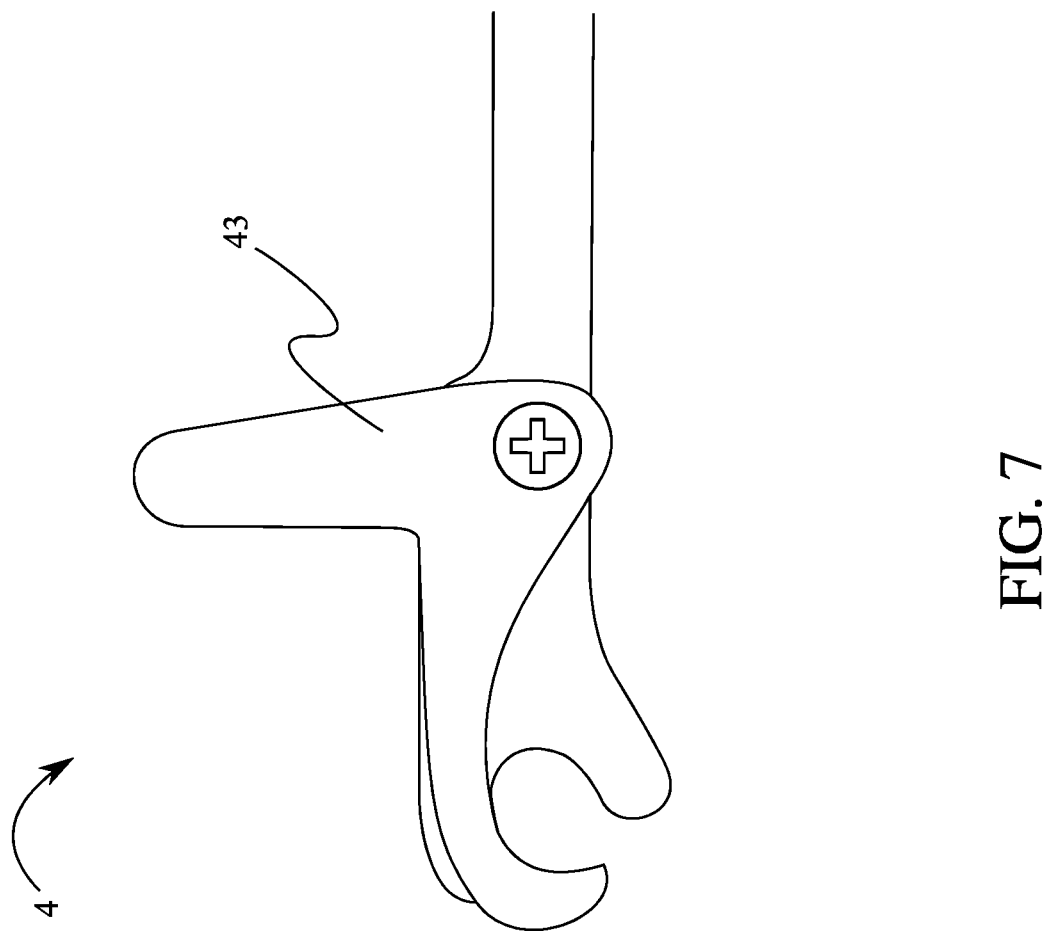
FIG. 7 is a side view of the distal end of one of the at least one cantilever, wherein the seat latch is in a closed position.
Figure 8:
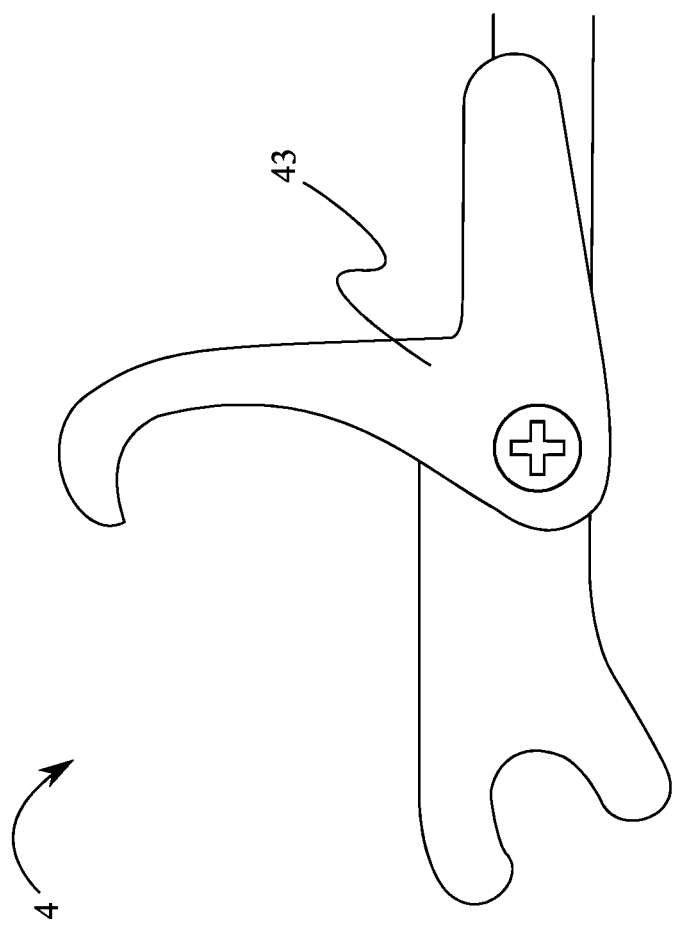
FIG. 8 is a side view of the distal end of one of the at least one cantilever, wherein the seat latch is in an open position.

In reference to FIG. 7-8, in some embodiments, each of the at least one cantilever 4 comprises a seat latch 43. The seat latch 43 of each of the at least one cantilever 4 is distally positioned from the mattress pad 1, wherein the seat latch 43 is configured to releasably engage with a portion of the one or more airplane seats. The seat latch 43 may be spring-loaded to allow the user to easily attach and detach the mattress pad 1 to and from the one or more airplane seats. In some embodiments, the seat latch 43 is pivotally connected to the distal end of the cantilever arm, wherein the seat latch 43 is L-shaped, forming a latch end parallel with the cantilever arm and an actuation end perpendicular to the cantilever arm. The user may engage the actuation end of the seat latch 43 and pull the actuation end towards the mattress pad 1 in order to move the latch end up and down. Meanwhile, the latch end is contoured to hook around a portion of the one or more airplane seats. A spring mechanism that is mechanically connected in between the seat latch 43 and the cantilever arm, retains the seat latch 43 in a latched position when no force is applied to the actuation end.

To attach the at least one cantilever 4 to the one or more airplane seats, the actuation end is engaged to lift the latch end, wherein a sufficient force is applied to the actuation end to overcome the spring mechanism. The latch end is then positioned adjacent to a portion of the one or more airplane seats, such as a crossbar, a rod, or notched area between adjacent airplane seats. The actuation end is then released, wherein the spring mechanism directs the latch end to engage with the portion of the one or more airplane seats. The cantilever arm is positioned along the seat frame positioned between adjacent airplane seats, wherein the seat frame supports the at least one cantilever 4. When the user lays on the mattress pad 1, the weight of the user is distributed through the at least one cantilever 4 to support the user, wherein the seat latch 43 ensures the at least one cantilever 4 does not disengage from the one or more airplane seats to prevent the user and the mattress pad 1 from falling into the footwell.

Figure 4:
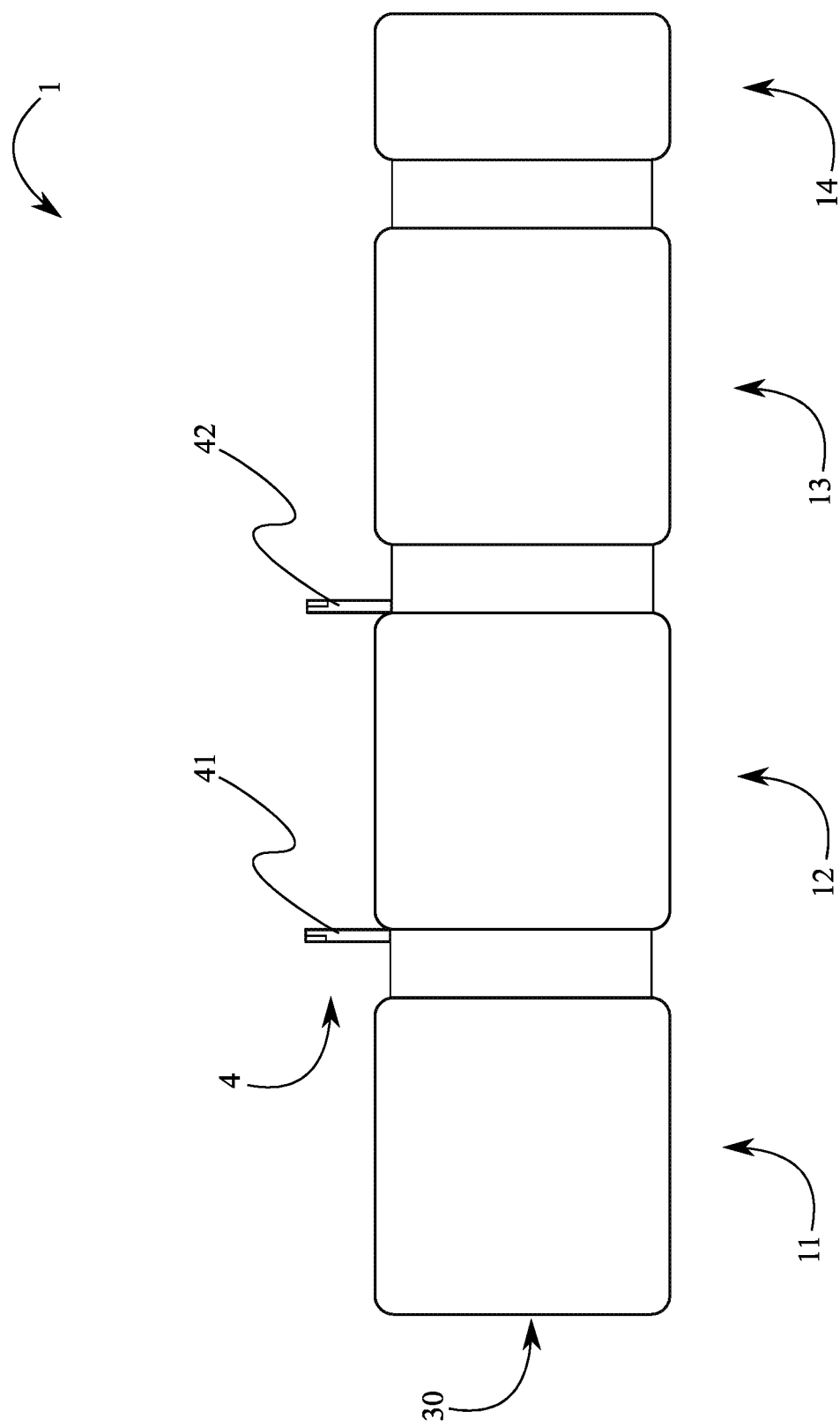
FIG. 4 is a top plan view of the mattress pad and the at least one cantilever in a folding embodiment of the present invention.
Figure 11:
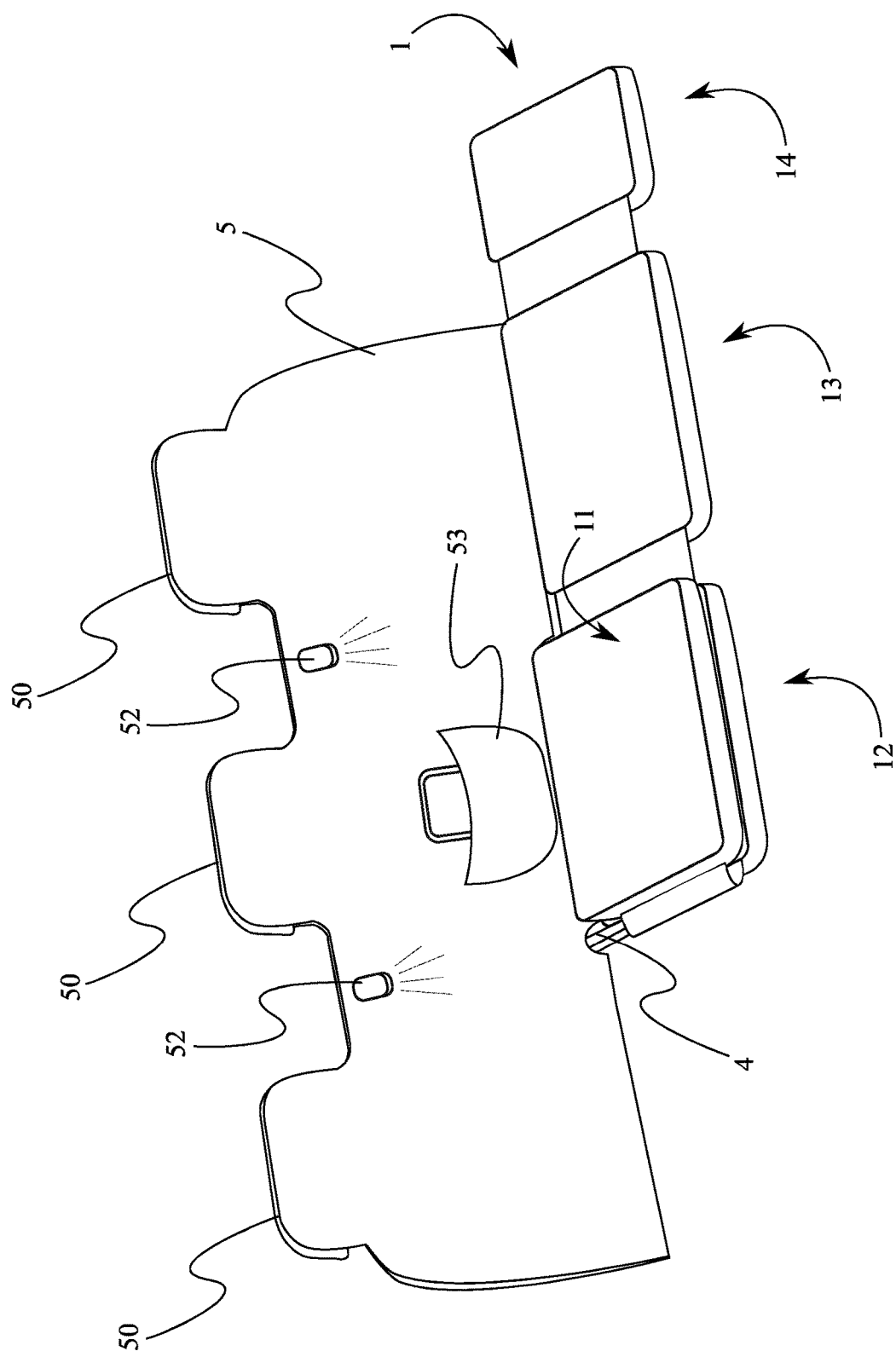
FIG. 11 is a perspective view showing the first section being folded over the second section in order to allow a user to take a seated position.
Figure 16:
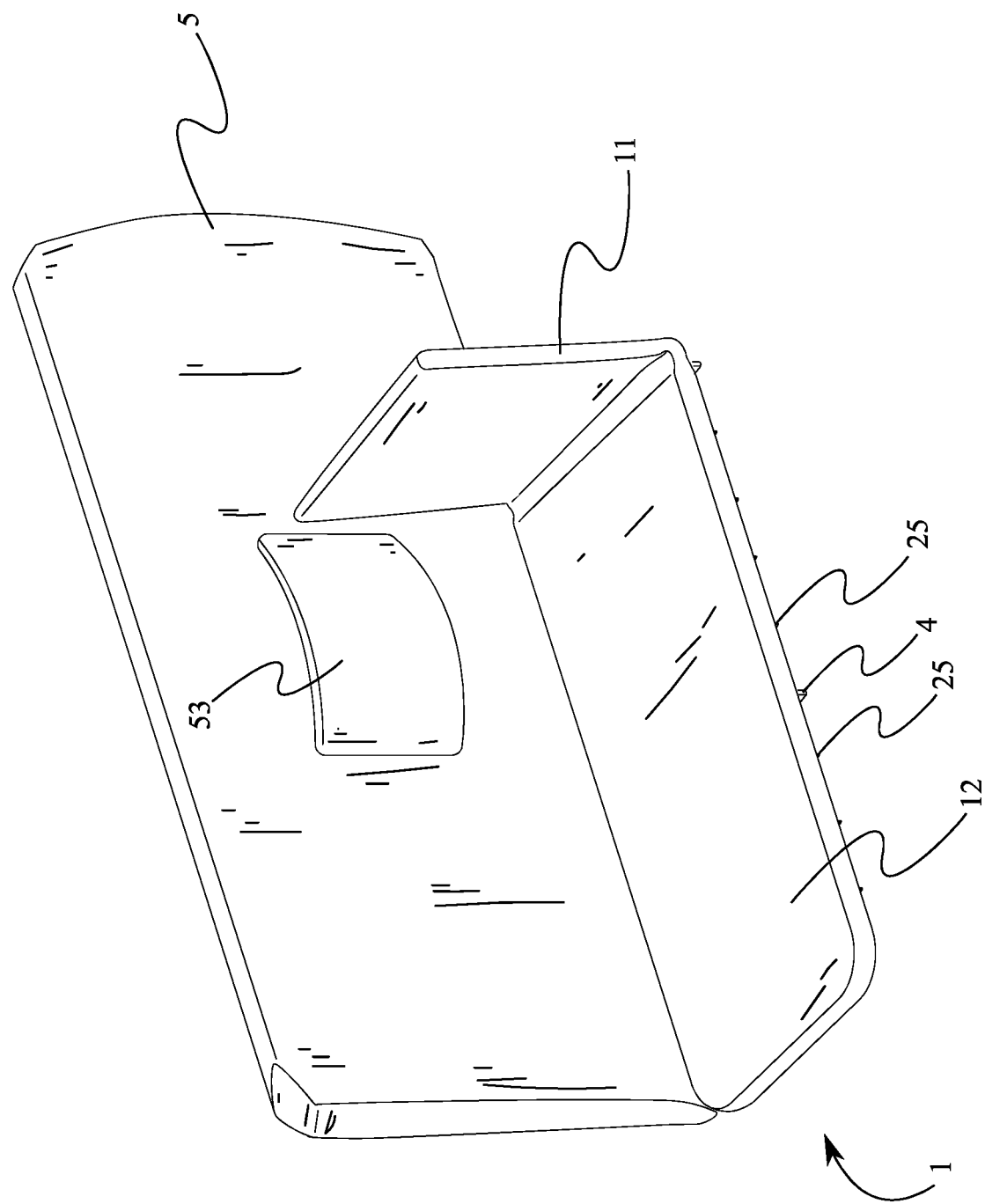
FIG. 16 is a perspective view showing the first section being lifted to allow the user to take a seated position.

In reference to FIG. 4, the padded layer 10 comprises a first section 11 and a second section 12, and optionally a third section 13 and a fourth section 14. The second section 12 is hingedly connected to the first section 11, such that the first section 11 can be lifted to provide access to a single airplane seat from the one or more airplane seats, as shown in FIG. 11 and FIG. 16. This allows the user to sit in and buckle into the single airplane seat for takeoff and landing in the standard, approved position, without having to remove the mattress pad 1 from the remaining airplane seats. While the first section 11 covers the single airplane seat, the second section 12 may be configured to cover one or more remaining airplane seats in the row. In embodiments with the third section 13, the third section 13 is hingedly connected to the second section 12 opposite the first section 11. In such embodiments, each of the first section 11, the second section 12, and the third section 13 may cover a single airplane seat. Alternatively, the third section 13 may provide a headrest portion that is positioned adjacent to the airplane window. In embodiments with the fourth section 14, the fourth section 14 is hingedly connected to the third section 13 opposite the second section 12. In such embodiments, the fourth section 14 provides a headrest portion that is positioned adjacent to the airplane window, while each of the first section 11, the second section 12, and the third section 13 covers a single airplane seat. The hinge connecting the first section 11 and the second section 12, the second section 12 and the third section 13, and the third section 13 and the fourth section 14 may be formed by a thinner section of the material that is used to form the padded layer 10. Alternatively, the hinge between each of the sections may be formed by the mattress cover 30.

Figure 6:
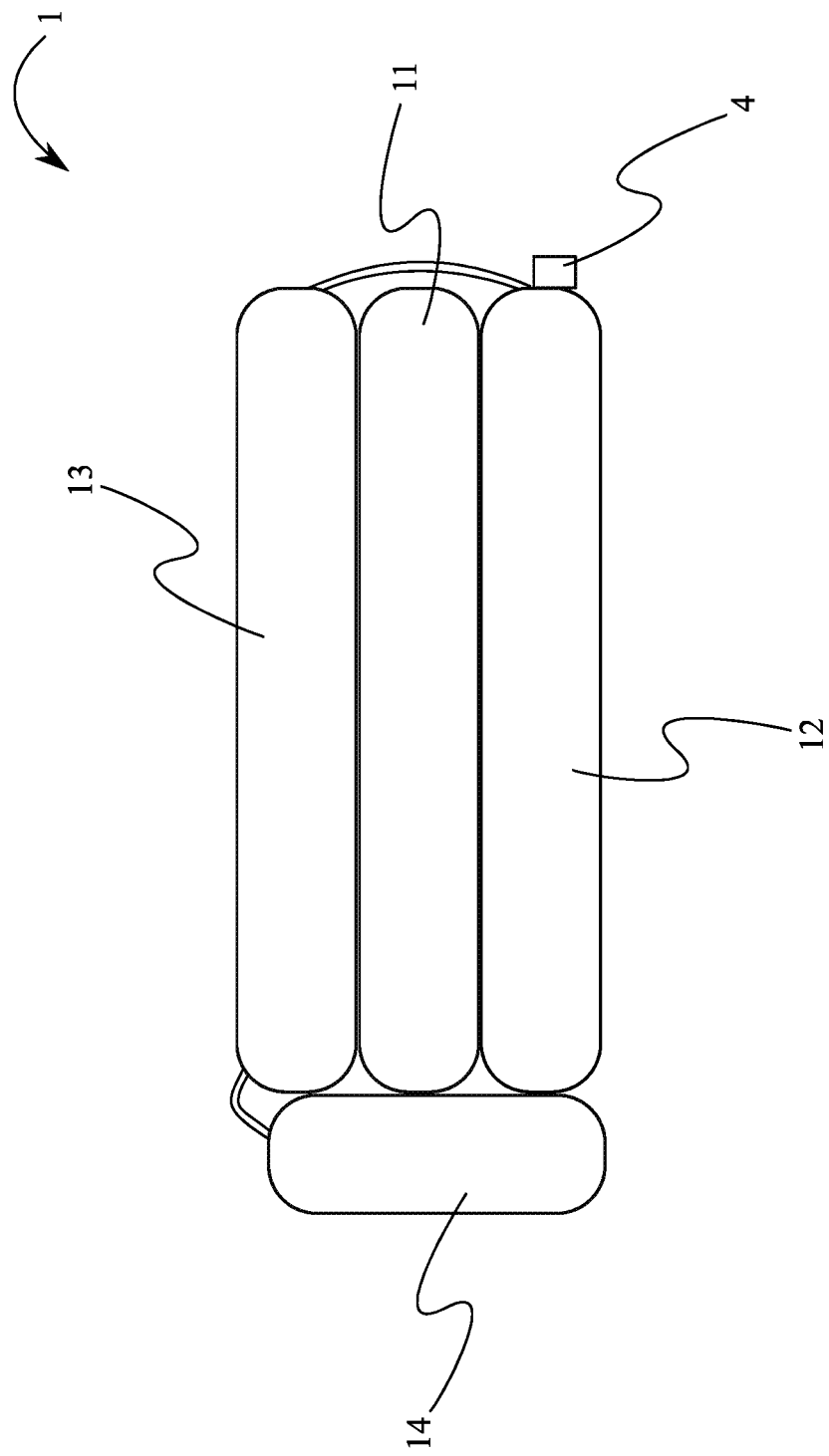
FIG. 6 is a front view showing the mattress pad being folded over for storage or transportation.

In an exemplary folding embodiment, the mattress pad 1 is configured to fold up for transport and storage as shown in FIG. 6, wherein the padded layer 10 comprises the first section 11, the second section 12, the third section 13, and the fourth section 14. Similarly and in reference to FIG. 5, the plurality of bottom supports 20 comprises a first bottom support 21, a second bottom support 22, a third bottom support 23, and a fourth bottom support 24. The first bottom support 21, the second bottom support 22, the third bottom support 23, and the fourth bottom support 24 are sized to approximately match the length and width of the first section 11, the second section 12, the third section 13, and the fourth section 14 respectively. In further reference to FIG. 5, the mattress cover 30 comprises a first portion 31, a second portion 32, a third portion 33, and a fourth portion 34, wherein: the first section 11 and the first bottom support 21 are encased in the first portion 31 of the mattress cover 30;

the second section 12 and the second bottom support 22 are encased in the second portion 32 of the mattress cover 30; the third section 13 and the third bottom support 23 are encased in the third portion 33 of the mattress cover 30; and the fourth section 14 and the fourth bottom support 24 are encased in the fourth portion 34 of the mattress cover 30. The mattress cover 30 further has a hinge section between the first portion 31 and the second portion 32, between the second portion 32 and the third portion 33, and between the third portion 33 and the fourth portion 34, thus allowing the mattress pad 1 to be folded up.

In the exemplary folding embodiment, the at least one cantilever 4 comprises a first cantilever 41 and a second cantilever 42, wherein the first cantilever 41 and the second cantilever 42 are adjacently connected to the second section 12 as depicted in FIG. 4. The first cantilever 41 is positioned opposite the second cantilever 42, along the second section 12, wherein the first cantilever 41 is positioned in between the first section 11 and the second section 12 and the second cantilever 42 is positioned in between the second section 12 and the third section 13. In this way, the first cantilever 41 and the second cantilever 42 are positioned on either side of the middle seat in a seat row having three seats. A small opening is provided in the mattress cover 30 on both sides of the second section 12, such that the first cantilever 41 and the second cantilever 42 are able to extend out and away from the mattress pad 1.

Figure 17:
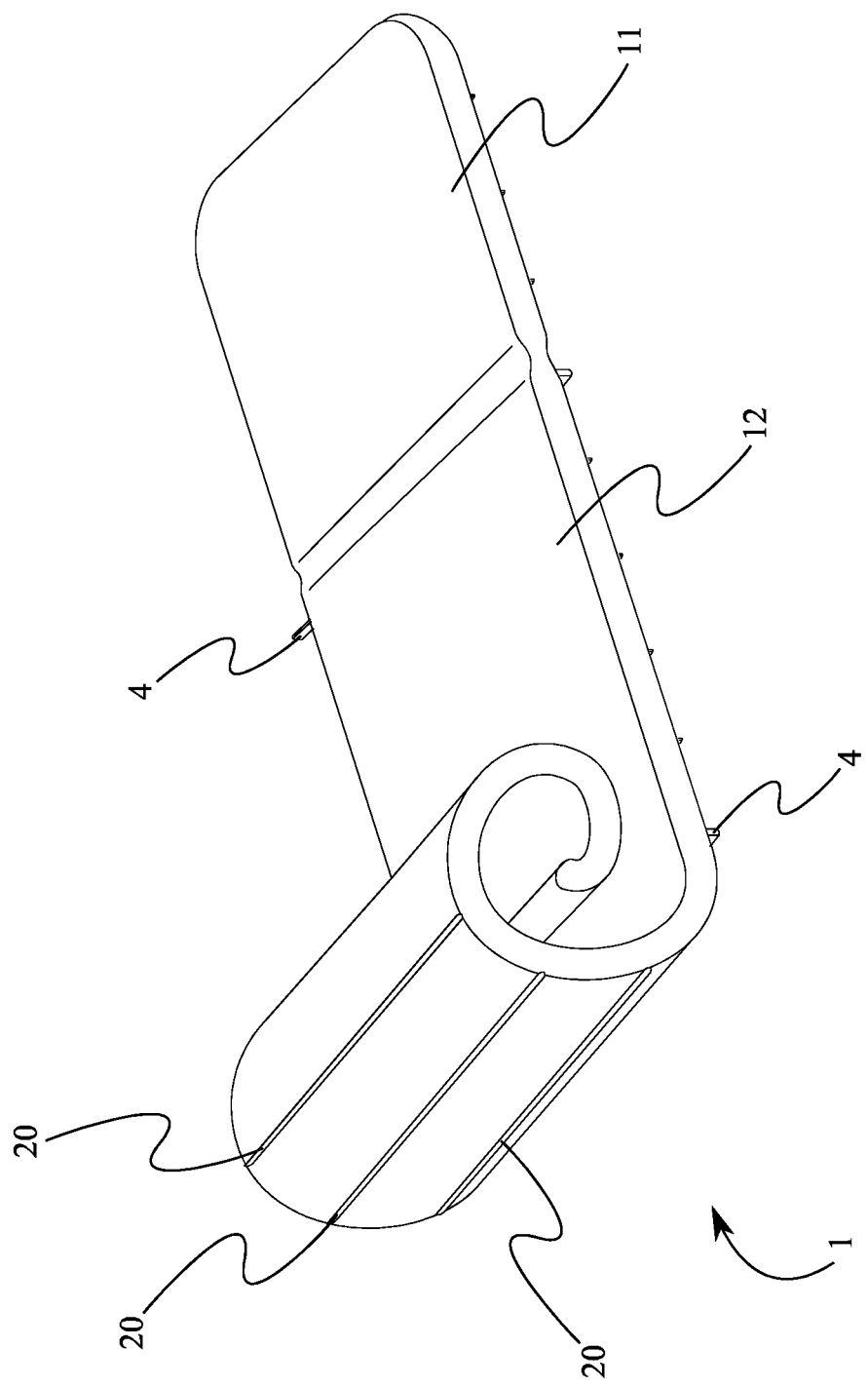
FIG. 17 is a perspective view of the mattress pad, wherein the mattress pad is in the process of being rolled up.
Figure 18:
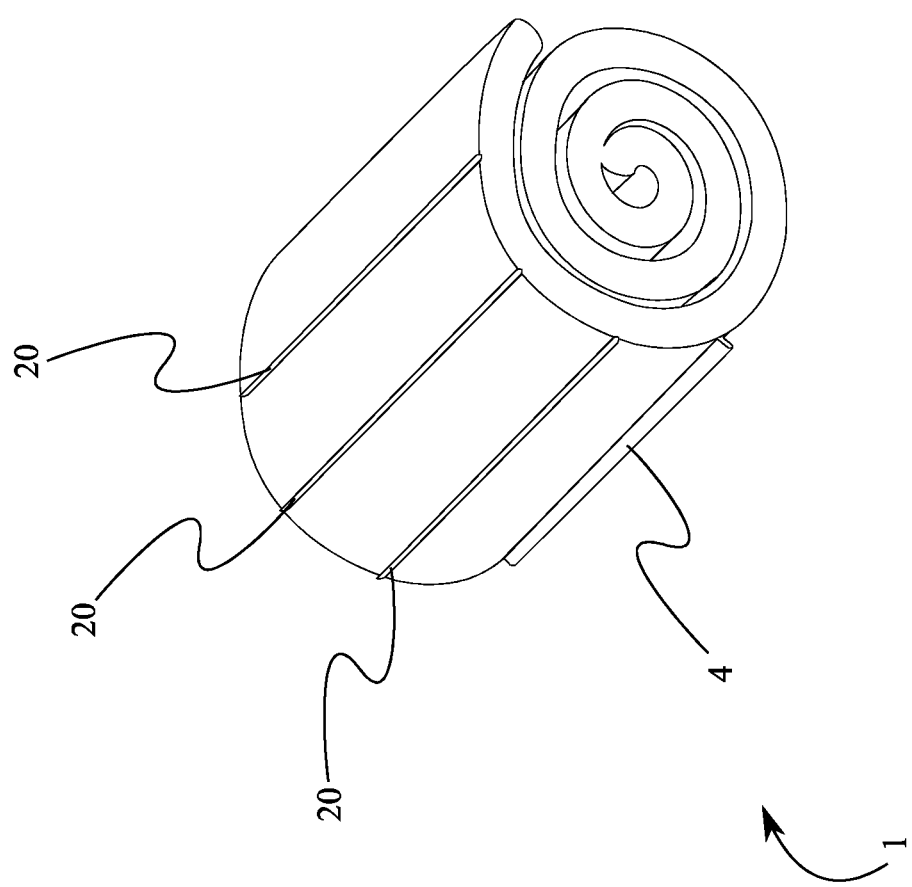
FIG. 18 is a perspective view of the mattress pad being fully rolled up.

In an exemplary rolling embodiment, the mattress pad 1 is configured to roll up for transport and storage as shown in FIG. 17-18, wherein the padded layer 10 comprises the first section 11, the second section 12, and the third section 13. The first section 11, the second section 12, and the third section 13 are formed from a single piece of material, wherein a thinner section of material is formed between the first section 11 and the second section 12, and between the second section 12 and the third section 13. In this way, the padded layer 10 is able to easily fold about the thinner sections, in addition to being able to be rolled up. In reference to FIG. 15 and FIG. 17-18, each of the plurality of bottom supports 20 is a slat that extends across the width of the padded layer 10, wherein each of the plurality of bottom supports 20 is parallel with each other. The plurality of bottom supports 20 is distributed along the padded layer 10, such that the padded layer 10 is supported about key points. Each of the plurality of bottom supports 20 may have a different height depending on the location along the padded layer 10, wherein the height differences in the plurality of bottom also corresponds to the curvature of the one or more airplane seats. In this way, the padded layer 10 is supported in a manner such that the padded layer 10 is maintained in a flat position across the row of seats.

Figure 15:
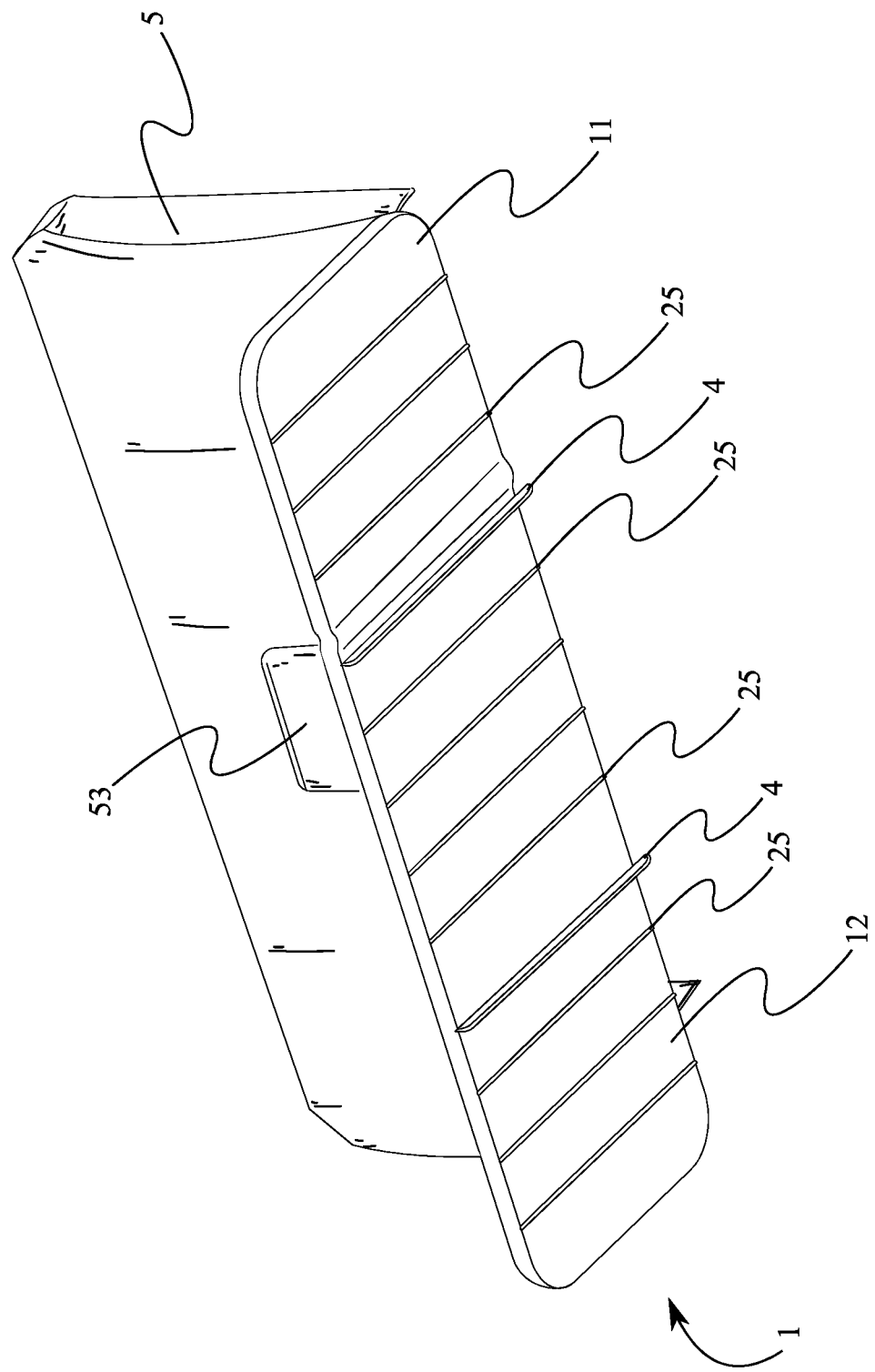
FIG. 15 is a bottom perspective view, wherein the plurality of bottom supports is a plurality of slats.

In the exemplary rolling embodiment, the at least one cantilever 4 comprises the first cantilever 41 and the second cantilever 42, wherein the first cantilever 41 and the second cantilever 42 are adjacently connected to the second section 12. The first cantilever 41 and the second cantilever 42 are spaced amongst the plurality of bottom supports 20, along the second section 12, as shown in FIG. 15. Furthermore, the first cantilever 41 and the second cantilever 42 are positioned along the second section 12 such that the first cantilever 41 and the second cantilever 42 are positioned on either side of the middle seat in a seat row having three seats. The spacing of the plurality of bottom supports 20, the first cantilever 41, and the second cantilever 42 provides open sections along the padded layer 10, thus allowing the mattress pad 1 to be easily rolled up for transport or storage.

The seatback cover 5 is a generally flexible, soft pad that covers the seatback of each of the one or more airplane seats. The seatback cover 5 provides a number of advantages to the user. For one, the seatback cover 5 provides additional privacy to the user by obscuring the gaps between each of the one or more airplane seats. Furthermore, the seatback cover 5 provides an additional padded layer 10 between the user and the one or more airplane seats, thus providing added comfort to the user. Additionally, the seatback cover 5 may provide further utility to the user in the form of storage space or lighting.

Figure 9:
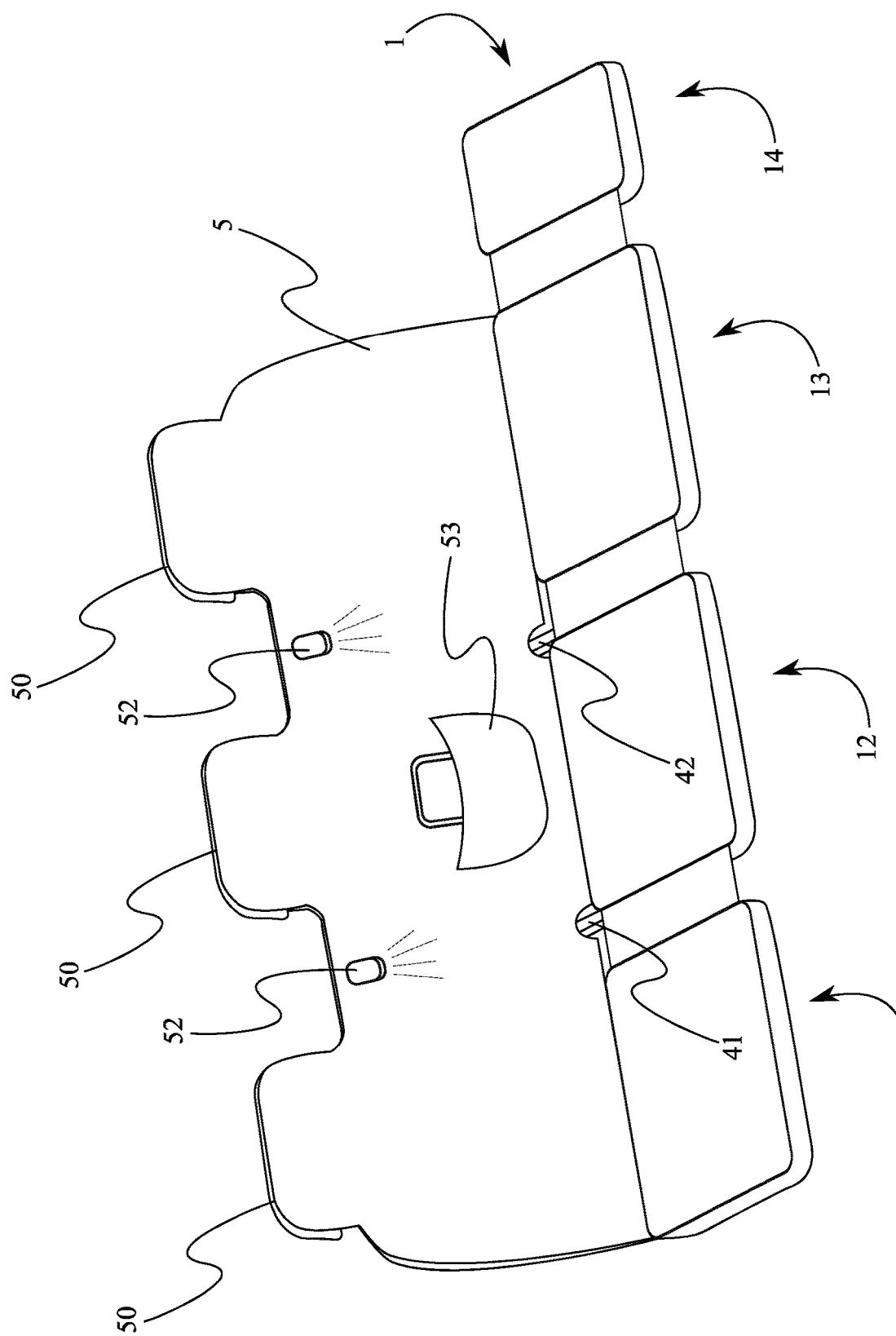
FIG. 9 is a perspective view showing the seatback cover being implemented with the mattress pad.

In reference to FIG. 9, the seatback cover 5 is laterally attached to the mattress pad 1, wherein the seatback cover 5 is positioned along the mattress pad 1. The seatback cover 5 may be permanently fixed to the mattress pad 1 or removably attached to the mattress pad 1 using a fastener system, such as a zipper, hook and loops fasteners, snaps, buttons, etc. More specifically, the seatback cover 5 is laterally attached in a fixed or removable manner to the second section 12 and optionally the third section 13 depending on the embodiment. The seatback cover 5 may also be laterally attached to the first section 11. However, the seatback cover 5 should be laterally attached to the first section 11 in a removable manner in order to allow the first section 11 to be lifted so that the user may occupy one of the airplane seats in a normal sitting position when needed, as depicted in FIG. 11.

Figure 14:
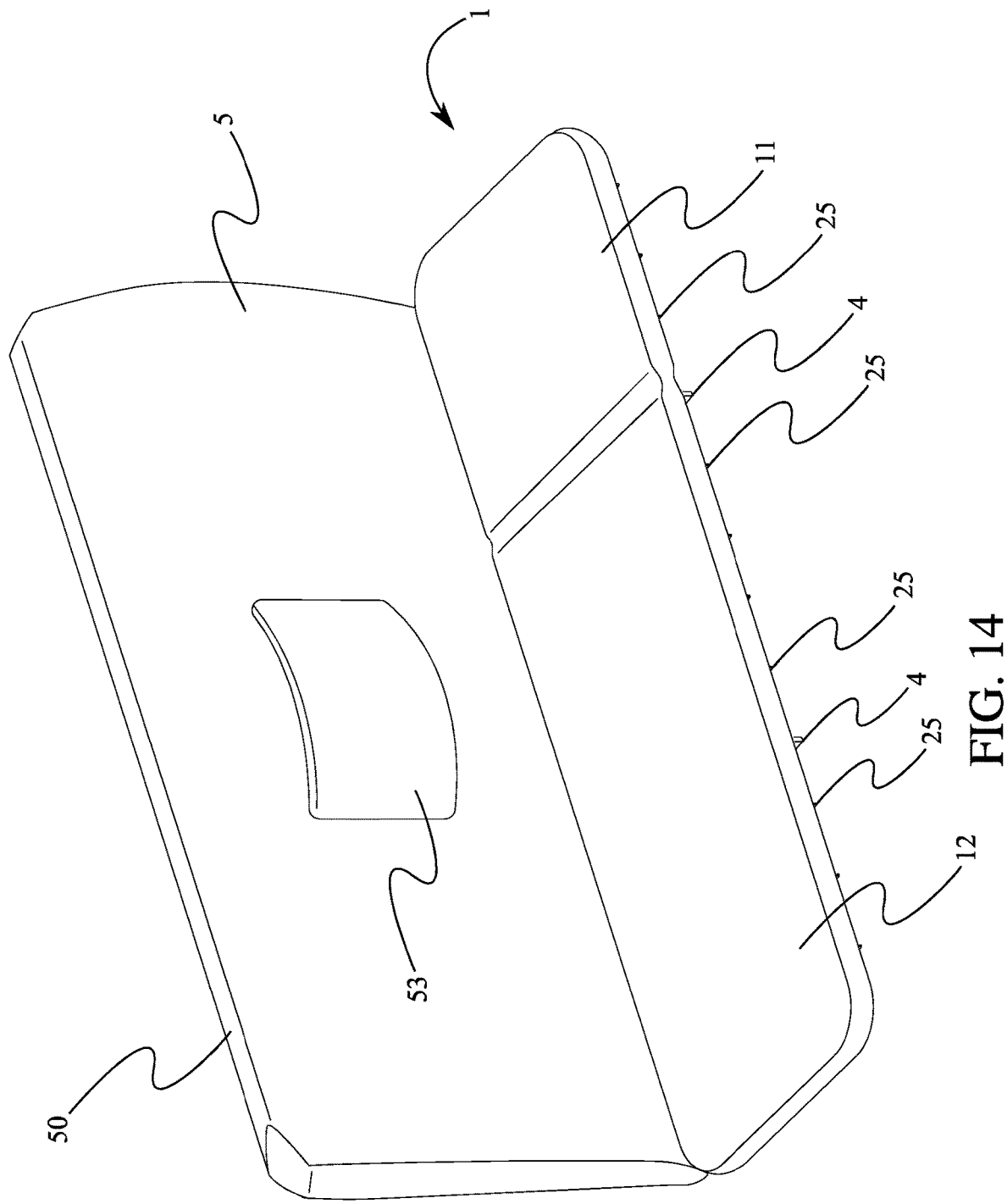
FIG. 14 is a top perspective view of the present invention, wherein the mattress pad is configured to roll up.

The seatback cover 5 comprises an at least one headrest hood 50 and may also comprise a pocket 53, a power supply 51, and a lighting device 52. The at least one headrest hood 50 provides a means for securing the seatback cover 5 to the one or more airplane seats, such that the seatback cover 5 remains draped across the seatback of each of the one or more airplane seats. The at least one headrest hood 50 is distally positioned from the mattress pad 1, such that the at least one headrest hood 50 engages with the headrest of one or more of the airplane seats. In some embodiments, the at least one headrest hood 50 may be a single pocket that is configured to be positioned around each headrest of the one or more airplane seats at once, as depicted in FIG. 14. In other embodiments, the at least one headrest hood 50 may be a number of pockets corresponding to the number of seats in the row, wherein each pocket configured to be positioned around an individual seat headrest, as depicted in FIG. 9.

In reference to FIG. 9, the pocket 53 is oriented towards the mattress pad 1, such that the pocket 53 is facing away from the seatback of the one or more airplane seats, wherein the user can access the pocket 53 to store items. In some embodiments, the seatback cover 5 may comprise one or more additional pockets to provide additional storage space. The pocket 53 may be positioned anywhere on the seatback cover 5. In some embodiments, the pocket 53 is positioned in the middle of the seatback cover 5. In this way, the pocket 53 is readily accessible when the user is laying down or when the user is seated in one of the airplane seats.

Figure 13:
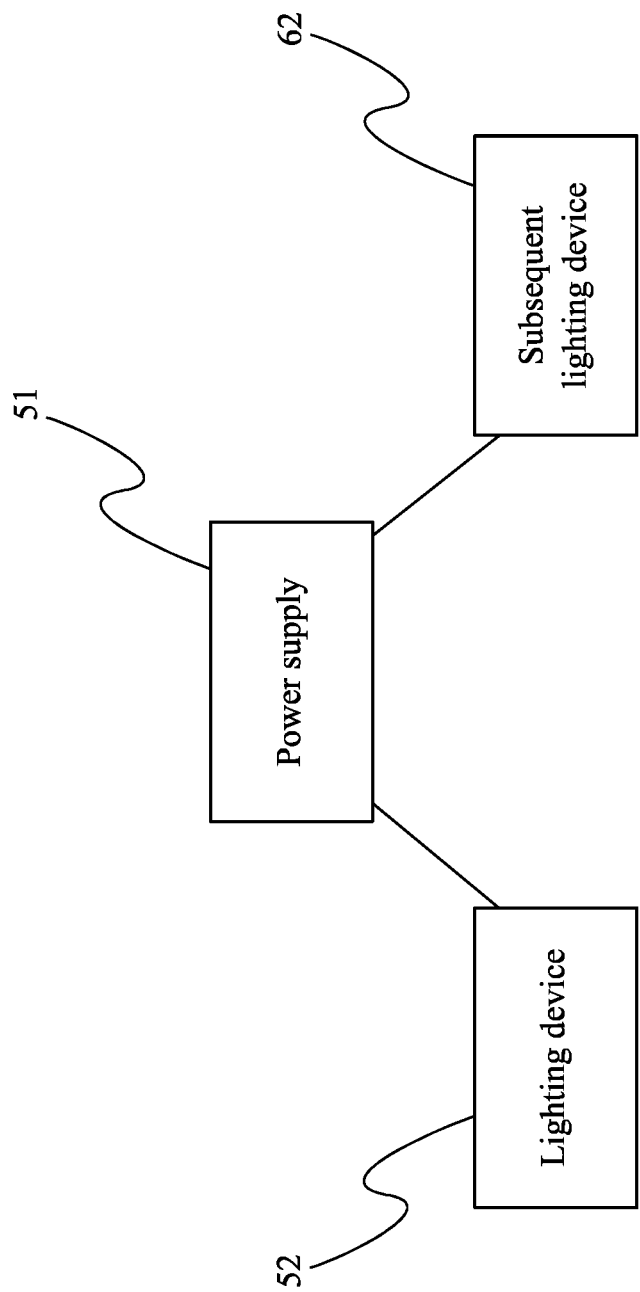
FIG. 13 is an electrical diagram showing the power distribution from the power supply to the lighting device and the subsequent lighting device.

In further reference to FIG. 9, the lighting device 52 is integrated into the cover portion of the seatback cover 5, such that the lighting device 52 is directed down on the user. The lighting device 52 is electrically connected to the power supply 51 as depicted in FIG. 13, wherein the power supply 51 directs current to the lighting device 52 as dictated by the user. More specifically, the lighting device 52 comprises a power cord and a light source, wherein the light source is electrically connected to the power supply 51 through the power cord. The power cord may be integrated between layers of the cover portion, such that the power cord is not visible to the user. The light source may be one or more light emitting diodes, on or more incandescent bulbs, or any other suitable means of illumination.

Figure 10:
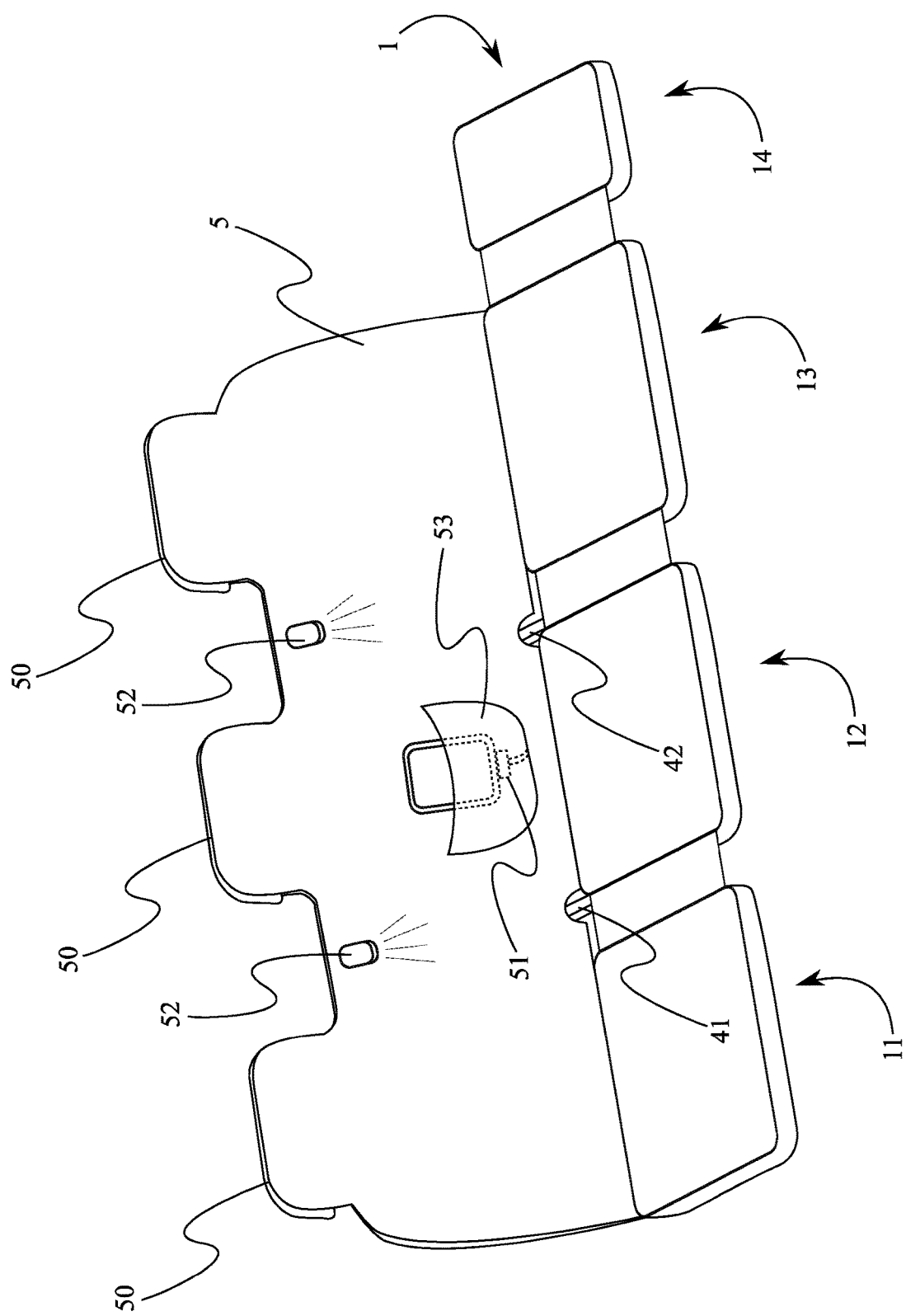
FIG. 10 is a perspective view showing the power supply positioned within the pocket.

In some embodiments, the power supply 51 may be a plug, such as a universal serial bus plug, that is plugged into an electronic device such as a tablet computer. Electrical current is then drawn from the electronic device through the power supply 51 in order to power the lighting device 52. The electronic device may also be used as a control device to adjust setting of the lighting device 52, such as the brightness, color, etc. In such embodiments, the power supply 51 may be positioned within the pocket 53 as depicted in FIG. 10, such that the electronic device may be stored in the pocket 53 as power is delivered to the lighting device 52. In other embodiments, the power supply 51 may be a battery back that is integrated into the cover portion, wherein the power supply 51 directly supplies current to the lighting device 52. In such embodiments, a separate control device may be used to control the supply of power to the lighting device 52, in addition, to the settings of the lighting device 52. The control device may include a touchscreen, one or more buttons, one or more switches, or any other suitable means for acquiring user input.

Figure 12:
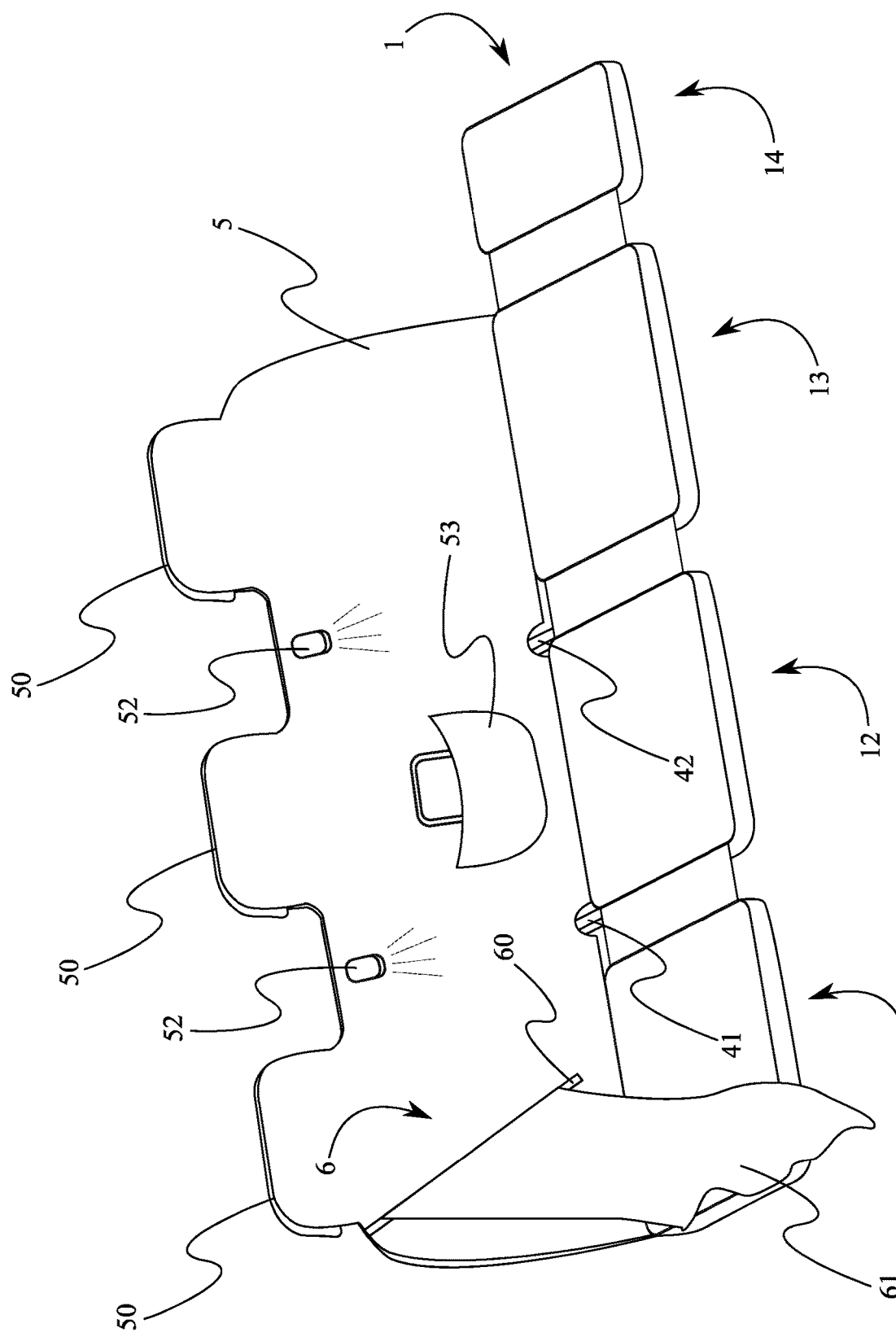
FIG. 12 is a perspective view showing the privacy curtain being implemented with the setback cover and the mattress pad.

In reference to FIG. 12, the privacy curtain 6 provides the user with additional privacy from the aisle of the airplane, wherein the privacy curtain 6 comprises a hanger 60 and a set of drapes 61. The privacy curtain 6 is terminally connected to the seatback cover 5, opposite the mattress pad 1, such that the privacy curtain 6 is suspended at the height of the seat headrests. While one end of the privacy curtain 6 is attached to the seatback cover 5, the opposite end of the privacy curtain 6 can be removably secured to the headrest of the leading row of seats. As such, a removable fastener may be installed on the headrest of the leading seat. Fastening means such as hook and loop fasteners, snaps, buttons, etc. may be used to secure the privacy curtain 6 to the headrest of the leading seat. The privacy curtain 6 may be permanently fixed to the seatback cover 5 or removably attached to the seatback cover 5 in a manner similar to the attachment between the privacy curtain 6 and the headrest of the leading seat.

The hanger 60 may be a solid or flexible rod, or a piece of string, cord, etc. If the hanger 60 is a rod, then the hanger 60 may be telescopic or designed to fold up, such that the hanger 60 can be compacted for transport and storage. The hanger 60 is attached to both the seatback cover 5 and the headrest of the leading seat. The set of drapes 61 is slidably positioned along the hanger 60, such that the set of drapes 61 can be separated, pushed to one side, or distributed otherwise along the hanger 60.

In some embodiments, the privacy curtain 6 may further comprise a subsequent lighting device 62. The subsequent lighting device 62 may be integrated into the hanger 60 or the set of curtains, such that the subsequent lighting device 62 is directed down on the user. The subsequent lighting device 62 is electrically connected to the power supply 51 as depicted in FIG. 13, wherein the power supply 51 directs current to the subsequent lighting device 62 as dictated by the user. More specifically, the subsequent lighting device 62 comprises a subsequent power cord and a subsequent light source, wherein the subsequent light source is electrically connected to the power supply 51 through the subsequent power cord. The subsequent power cord may be integrated with the hanger 60 or may form the hanger 60. The subsequent light source may be one or more light emitting diodes, on or more incandescent bulbs, or any other suitable means of illumination.

The present invention may further comprise a retention device that is used to store the mattress pad 1 in either a folded or rolled up position. The retention device perimetrically encases the mattress pad 1 to compress the mattress pad 1 inwards and prevent the mattress pad 1 from expanding. In some embodiments, the retention device may be a bag, wherein the mattress pad 1 is compacted and then slipped inside of the bag. The bag may include a drawstring or other means of closure that is used to retain the mattress pad 1 within the bag. In other embodiments, the retention device is one or more straps, wherein each of the one or more straps is wrapped around the mattress pad 1 in order to compress the mattress pad 1. Each of the one or more straps may include a fastener at each terminal end, wherein the fastener of each terminal end is engaged with one another to secure each of the one or more straps around the mattress pad 1. The fasteners may include hook and loop fasteners, snaps, buttons, or any other suitable means for securing the terminal ends of each strap.

The present invention may further comprise a plurality of accessories that are used to provide additional comfort to the user. The plurality of accessories may include a pillow, a sheet, and one or more blankets. The pillow may be a soft foam or elastic polymeric material that enables cushioning of the user's head or other body parts. The sheet is a thin cover that the user places over the user, as a means of providing warmth and insulation to the user. The one or more blankets provides further warmth and comfort to the user if the user is too cool under the sheet alone. The retention device may also be used to store and transport one or more of the plurality of accessories alongside the mattress pad 1.

The present invention may be sold for personal ownership or may be sold to airlines, wherein the airline may provide the present invention to customers as a service for long, empty flights. In either case, to use the present invention, the user first removes the mattress pad 1 from the retention device. The user then unfolds or unrolls the mattress pad 1 and places the mattress pad 1 down along the one or more airplane seats, wherein each of the plurality of bottom supports 20 is oriented downwards and the padded layer 10 is oriented upwards, such that the user may rest on the padded layer 10. Ideally, the armrest of each of the one or more airplane seats is raised prior to placing the mattress pad 1 down. The user then secures the mattress pad 1 to the one or more airplane seats using the at least one cantilever 4, wherein each of the at least one cantilever 4 is placed between a pair of adjacent seats and attached to the crossbar or other frame member that connects the pair of adjacent seats. If the seatback cover 5 is utilized, the seatback cover 5 is then positioned along the seatback of each of the one or more airplane seats, wherein the at least one headrest hood 50 is secured about the headrest of each of the one or more airplane seats. If the privacy curtain 6 is utilized, the privacy curtain 6 is then positioned adjacent to the main aisle of the aircraft and attached in between the seatback cover 5 and the headrest of the leading seat. If the plurality of accessories is utilized, each of the plurality of accessories may then be laid out on the mattress pad 1 for use by the user.

Once the mattress pad 1 has been secured to the one or more airplane seats using the at least one cantilever 4, the first section 11 may be lifted from one of the airplane seats allowing the user to take a seated position during takeoff and landing. When in either a seated or lying position, the user may make use of the pocket 53 and the lighting device 52 of the seatback cover 5, wherein the pocket 53 provides additional storage and the lighting device 52 provides additional lighting. The user may also use the subsequent lighting device 62 of the privacy curtain 6 to provide light from an additional angle.

To store the present invention, the user first removes the plurality of accessories from the mattress pad 1. However, in some embodiments the mattress pad 1 may be configured to fold or roll up with a sheet or blanket still attached. The privacy curtain 6 is then detached from the headrest of the leading seat and the seatback cover 5 is removed from the headrest of each of the one or more airplane seats. The user then actuates each of the at least one cantilever 4 in order to disengage each of the at least one cantilever 4 from the one or more airplane seats. The user may then fold or roll up the mattress pad 1, wherein the user may further utilize the retention device to maintain the mattress pad 1 in the folded or rolled configuration.

Although the invention has been explained in relation to its preferred embodiment, it is to be understood that many other possible modifications and variations can be made without departing from the spirit and scope of the invention as hereinafter claimed.

What is claimed is:

1. A cantilevered mattress comprises:
    a mattress pad;
    an at least one cantilever;
    the mattress pad comprises a padded layer and a plurality of bottom supports;
    the padded layer comprising a first section and a second section;
    the second section being hingedly connected to the first section;
    the plurality of bottom supports being adjacently connected to the padded layer;
    the plurality of bottom supports being distributed along the padded layer;
    the at least one cantilever being adjacently connected to the mattress pad;
    each of the at least one cantilever being positioned in between a pair of bottom supports from the plurality of bottom supports;
    the at least one cantilever laterally extending from the mattress pad;
    each of the at least one cantilever comprising a seat latch; and
    the seat latch being distally positioned from the mattress pad.

2. The cantilevered mattress as claimed in claim 1 comprises:
    the padded layer further comprising a third section; and
    the third section being hingedly connected to the second section, opposite the first section.

3. The cantilevered mattress as claimed in claim 2 comprises:
    the padded layer further comprising a fourth section; and
    the fourth section being hingedly connected to the third section, opposite the second section.

4. The cantilevered mattress as claimed in claim 1 comprises:
    the at least one cantilever comprising a first cantilever and a second cantilever;
    the first cantilever and the second cantilever being adjacently connected to the second section; and
    the first cantilever being positioned opposite the second cantilever, along the second section.

5. The cantilevered mattress as claimed in claim 4 comprises:
    the first cantilever being positioned in between the first section and the second section.

6. The cantilevered mattress as claimed in claim 4 comprises:
    the padded layer further comprising a third section;
    the third section being hingedly connected to the second section, opposite the first section; and
    the second cantilever being positioned in between the second section and the third section.

7. The cantilevered mattress as claimed in claim 1 comprises:
    the mattress pad further comprising a mattress cover; and
    the padded layer and the plurality of bottom supports being enclosed within the mattress cover.

8. The cantilevered mattress as claimed in claim 7 comprises:
    the plurality of bottom supports comprising a first bottom support and a second bottom support;
    the first section and the first bottom support being encased in a first portion of the mattress cover; and
    the second section and the second bottom support being encased in a second portion of the mattress cover.

9. The cantilevered mattress as claimed in claim 8 comprises:
    the padded layer further comprising a third section;
    the plurality of bottom supports further comprising a third bottom support; and
    the third section and the third bottom support being encased in a third portion of the mattress cover.

10. The cantilevered mattress as claimed in claim 1 comprises:
    the seat latch being spring-loaded.

11. The cantilevered mattress as claimed in claim 1 comprises:
    a seatback cover;
    the seatback cover being laterally attached to the mattress pad; and
    the seatback cover being positioned along the mattress pad.

12. The cantilevered mattress as claimed in claim 11 comprises:
    a privacy curtain; and
    the privacy curtain being terminally attached to the seatback cover, opposite the mattress pad.

13. The cantilevered mattress as claimed in claim 11 comprises:
    the seatback cover comprising an at least one headrest hood; and
    the at least one headrest hood being distally positioned from the mattress pad.

14. The cantilevered mattress as claimed in claim 11 comprises:
    the seatback cover comprising a power supply and a lighting device; and
    the lighting device being electrically connected to the power supply.

15. The cantilevered mattress as claimed in claim 14 comprises:
    the seatback cover comprising a pocket; and
    the power supply being positioned within the pocket.

16. The cantilevered mattress as claimed in claim 11 comprises:
    the seatback cover comprising a pocket; and
    the pocket being oriented towards the mattress pad.

* * * * *